US009004707B2

(12) United States Patent
Malik

(10) Patent No.: US 9,004,707 B2
(45) Date of Patent: Apr. 14, 2015

(54) UNIVERSAL REEL BACKLIGHT FOR REEL-TYPE GAMING MACHINES

(75) Inventor: Furqaan Malik, Austin, TX (US)

(73) Assignee: Multimedia Games, Inc., Austin, TX (US)

( * ) Notice: Subject to any disclaimer, the term of this patent is extended or adjusted under 35 U.S.C. 154(b) by 186 days.

(21) Appl. No.: 13/220,589

(22) Filed: Aug. 29, 2011

(65) Prior Publication Data

US 2012/0120632 A1 May 17, 2012

Related U.S. Application Data

(60) Provisional application No. 61/413,474, filed on Nov. 14, 2010.

(51) Int. Cl.

| | |
|---|---|
| ***G09F 13/04*** | (2006.01) |
| ***A63F 9/24*** | (2006.01) |
| ***A63F 13/00*** | (2014.01) |
| ***G06F 17/00*** | (2006.01) |
| ***G06F 19/00*** | (2011.01) |
| ***G07F 17/32*** | (2006.01) |

(52) U.S. Cl.
CPC ........ *G07F 17/3202* (2013.01); *G07F 17/3211* (2013.01)

(58) Field of Classification Search
USPC ............ 362/97.1, 631, 249.2; 463/20, 30, 31, 463/34; 273/138.1, 138.2, 143 R
See application file for complete search history.

(56) References Cited

U.S. PATENT DOCUMENTS 4,306,716 A * 12/1981 James et al. .................... 463/31
5,375,830 A 12/1994 Takemoto et al.
6,027,115 A * 2/2000 Griswold et al. ......... 273/143 R
6,265,984 B1 * 7/2001 Molinaroli ................. 340/815.4
7,043,860 B2 * 5/2006 Inoue .............................. 40/582
7,232,127 B2 * 6/2007 Seelig et al. .............. 273/143 R
7,380,791 B2 6/2008 Gauselmann et al.
7,625,099 B2 * 12/2009 Newton et al. ................ 362/238
8,246,441 B2 * 8/2012 Bleich et al. .................... 463/31
2004/0166925 A1 8/2004 Emori et al.
2004/0209667 A1 10/2004 Emori et al.
2004/0209683 A1 10/2004 Okada
2004/0224758 A1 * 11/2004 Okada et al. .................... 463/31
2007/0139575 A1 * 6/2007 Wang .............................. 349/58
2007/0202947 A1 8/2007 Seelig et al.
2008/0113755 A1 5/2008 Rasmussen et al.
2008/0176653 A1 7/2008 Kishi
2009/0149242 A1 6/2009 Woodard et al.
2009/0153778 A1 6/2009 Nakaya
2009/0179597 A1 7/2009 Salmon
2012/0214572 A1 * 8/2012 Seelig et al. .................... 463/20

FOREIGN PATENT DOCUMENTS

JP 2008-245694 A 10/2008
JP 2009082381 A * 4/2009

* cited by examiner

*Primary Examiner* — Jong-suk (James) Lee

*Assistant Examiner* — Tsion Tumebo

(74) *Attorney, Agent, or Firm* — Russell D. Culbertson, Esq.; JP Cody, Esq.

(57) ABSTRACT

A reel backlight structure for a mechanical reel-type game includes an undifferentiated array of LED backlights. The rows of LEDs are closely spaced apart and may extend over an arc that encompasses both three vertical stop positions and four vertical stop positions. The LEDs are mounted on a flexible substrate that may be bent to match the radius of a reel strip and held in the desired radius with mounting attachment points.

14 Claims, 3 Drawing Sheets

UNIVERSAL REEL BACKLIGHT FOR REEL-TYPE GAMING MACHINES

CROSS-REFERENCE TO RELATED APPLICATION

The Applicant claims the benefit, under 35 U.S.C. §119(e), of U.S. Provisional Patent Application No. 61/413,474 filed Nov. 14, 2010, and entitled "Universal Reel Backlight For Reel-Type Gaming Machines." The entire content of this provisional application is incorporated herein by this reference.

BACKGROUND OF THE INVENTION

1. Field of the Invention

This invention relates to reel-type gaming machines and associated methods. More particularly, the invention relates to the backlighting used to backlight various areas or symbols on a reel of a mechanical reel-type gaming machine. A backlight structure according to the invention provides a single structure that may be used with different reel strips and different reel-type games.

2. Description of the Related Art

A variety of mechanical reel-type gaming machines backlight the reel symbols to provide various lighting effects. However, prior backlighting arrangements are limited to a narrow range of reel strips and are specific to a given reel-type game.

There is a need to provide a mechanical reel backlighting structure that is universally applicable for a variety of reel-type games having different numbers of horizontal stop positions.

SUMMARY OF THE INVENTION

The present invention includes a reel backlight assembly for a mechanical reel-type game. The assembly includes a series of rows of LEDs all mounted in a closely spaced apart arrangement along a length of flexible substrate. The substrate includes a series of mounting points by which the substrate may be secured to a frame in a radius matching the radius of a given reel strip.

These and other features of the invention will be apparent from the following description of illustrative embodiments, considered along with the accompanying drawings.

DESCRIPTION OF ILLUSTRATIVE EMBODIMENTS

Figure 1:
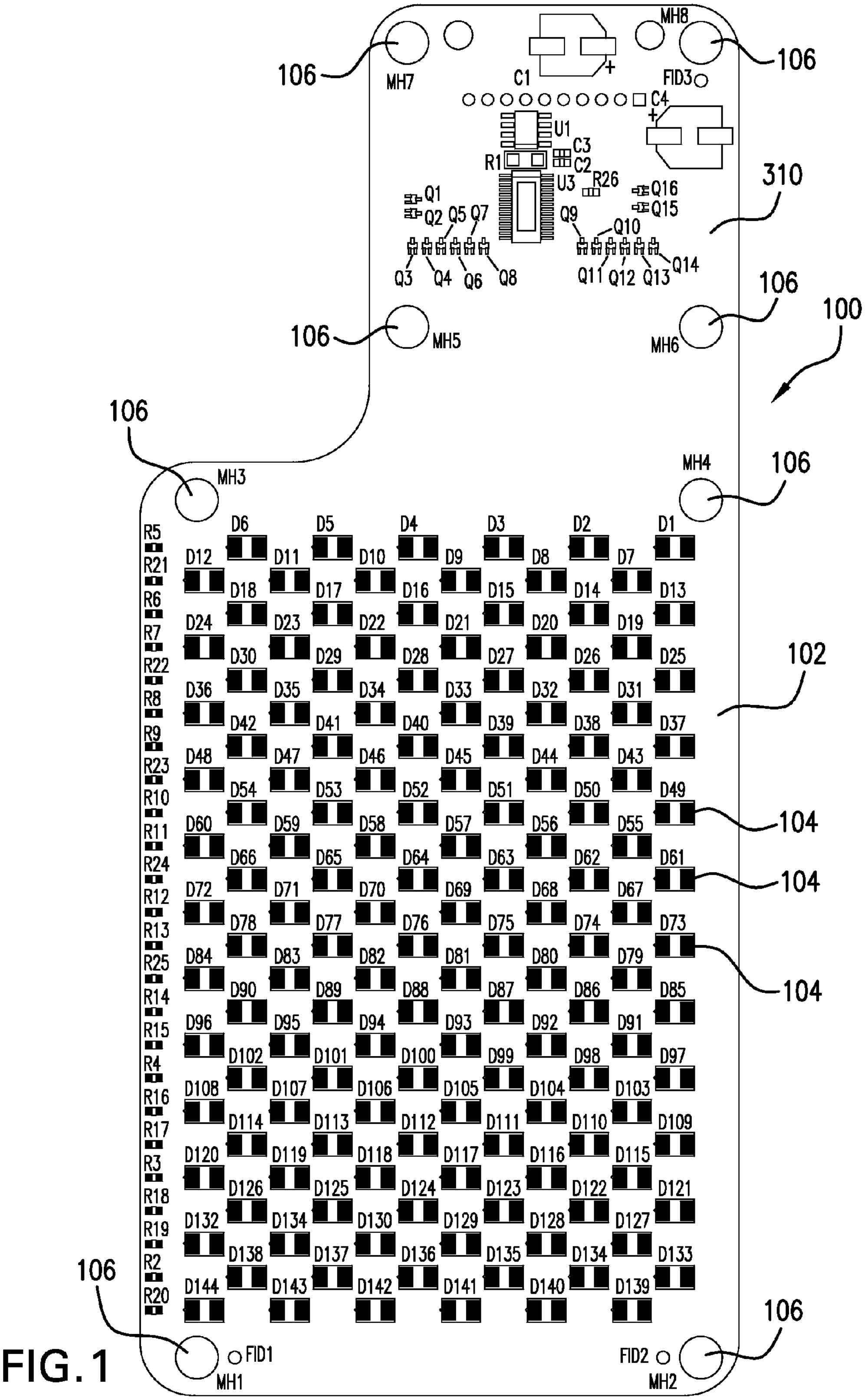
FIG. 1 is a top view of a backlight LED board according to one form of the invention.
Figure 3:
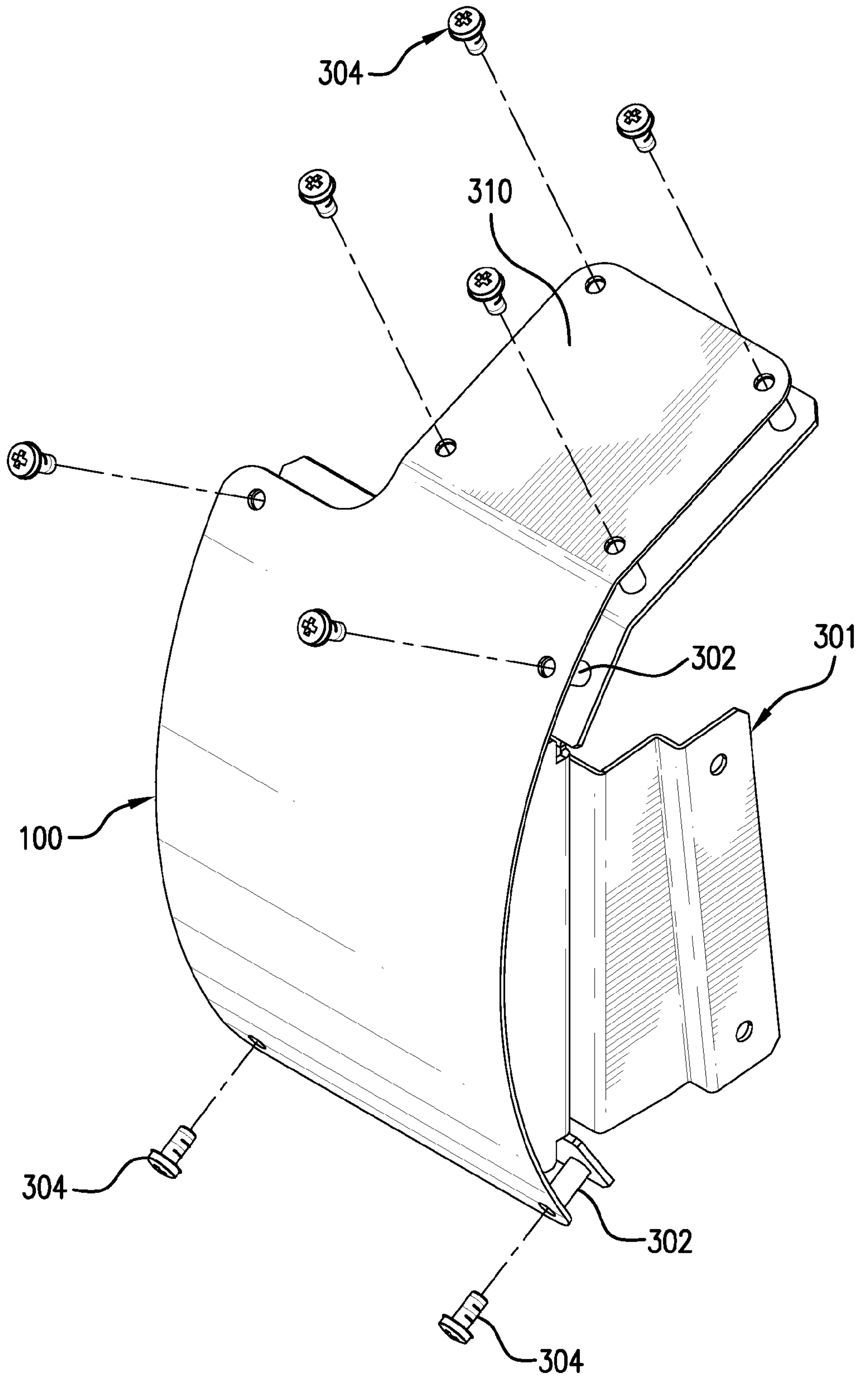
FIG. 3 is an exploded isometric view showing the backlight LED board of FIG. 1 in position to be mounted on a bracket for a reel of a mechanical reel-type game.

FIG. 1 shows an example backlight LED board assembly 100 embodying the principles of the invention. Board 100 includes a printed circuit board substrate 102 made of a material that is flexible in the longitudinal direction so that it may be bent from the relaxed state shown in FIG. 1 into a radius to match the radius of a reel strip in a mechanical reel-type game. An example of a bent condition of board substrate 102 is shown in FIG. 3. Referring again to FIG. 1, twenty-four transverse rows of LEDs 104 (which may be single color or multi-color LEDs) are mounted on the substrate 102. The LED rows are staggered to allow closer spacing between rows and because the closer spacing allows for more even lighting by using half the LEDs. Board 100 includes eight attachment openings 106 which each represent an attachment or mounting point at which the board may be mounted to a bracket. Each of the four lowermost openings 106 shown in FIG. 1 are located in a different respective corner of a rectangular light-supporting region of substrate 102. LEDs 104 are mounted in the rectangular light-supporting region of substrate 102. In one implementation, each LED 104 is individually controllable. Other forms of the invention may control each row of LEDs 104 as a unit.

Figure 2:
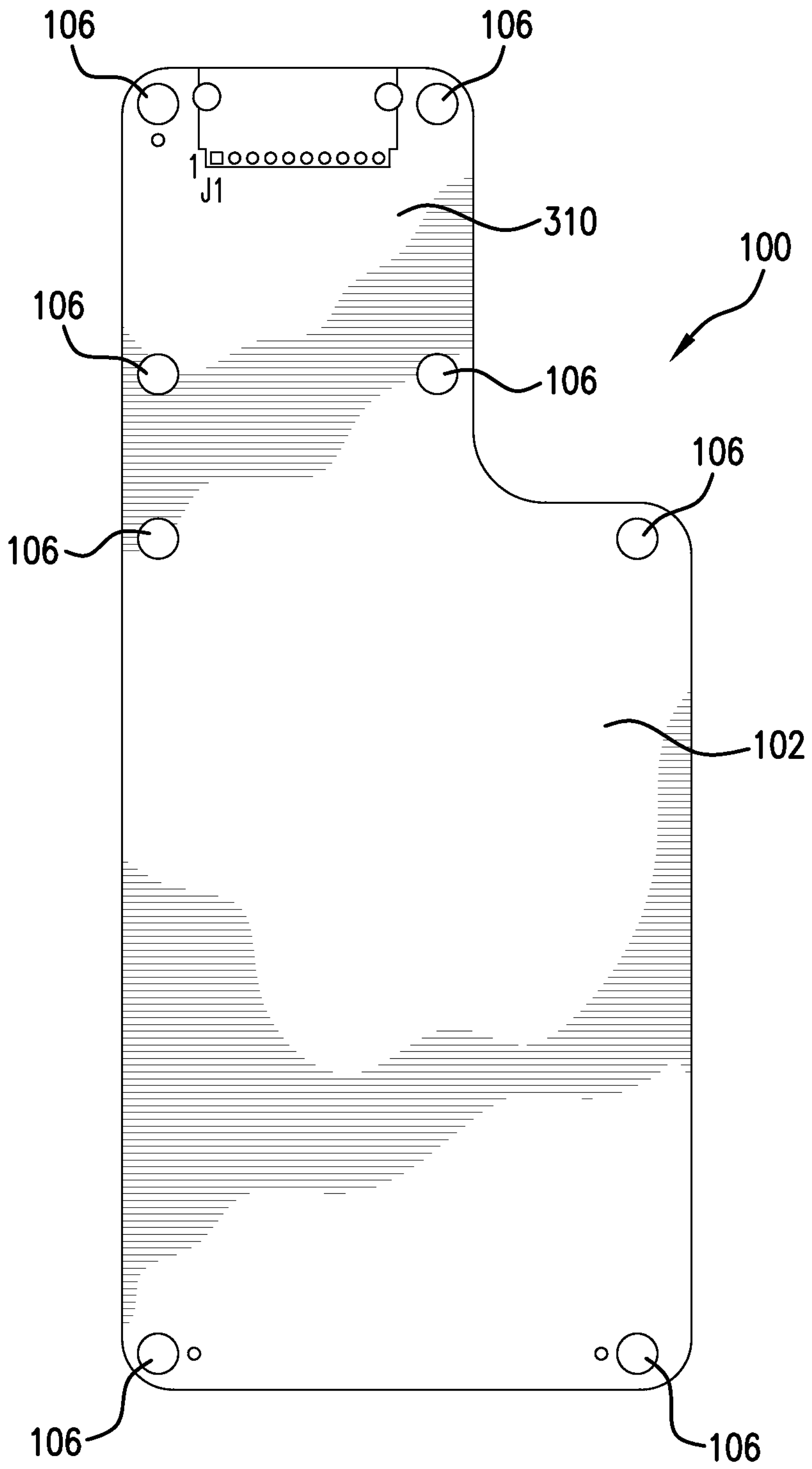
FIG. 2 is bottom view of the backlight LED board shown in FIG. 1.

FIG. 2 shows the bottom side of board 100, that is, the opposite side from that shown in FIG. 1. Substrate 102 and attachment openings 106 are visible in the view shown in FIG. 2.

Referring to FIG. 3, board 100 may be connected to a bracket 301 having stand-offs 302. The stand-offs 302 are arranged spatially so that when the proper attachment openings 106 of board 100 are connected to the stand-offs via connecting screws 304, the board assumes a radius which matches or is at least similar to the radius of a reel strip the board is intended to backlight. It will be appreciated that the bracket 301 and mounted board 100 reside inside the cylindrical area defined by the reel strip for which the board provides backlighting. The side of board 100 shown in FIG. 1 faces the inside surface of the reel strip when the board is in the proper connected position. It will be noted that a connector area 310 of board 100 includes its own connection points in this illustrated embodiment so that the connector area may extend at an angle to the radius formed by the remainder of board 100. This angle of connector area 310 to the radius formed by board 100 is apparent from FIG. 3.

The size of board 100 and the size of the area of LEDs 104 mounted on the board are such that the board may be used without modification in different reel-type games. For example, in a traditional reel-type game having 24 symbol positions on a reel and with three symbols showing on a given reel in a stopped position in a gaming machine, each showing symbol takes up six of the rows of LEDs 104. The respective six rows of LEDs may be operated to provide the desired backlighting for the respective symbol and the top and bottom three rows of LEDs remain off. In a reel-type game having 18 symbol positions per reel and three symbols showing in the symbol matrix, each symbol takes up eight rows of LEDs 104. The respective eight rows of LEDs 104 may be operated to provide the desired backlighting for the respective symbol. In this arrangement, all twenty-four rows of LEDs 104 are usable in providing backlighting. For reel-type games having 24 symbol positions on each reel and having four horizontal paylines (and thus requiring four vertical symbols to show on each reel) each symbol is backlit by six rows of LEDs 104.

Between these three different reel examples, all of the backlighting hardware remains the same. When a game is switched out on the gaming machine, the reel strips may change, but the same backlighting structure can operate in any of these three configurations.

Referring generally to the forgoing description and the following claims, as used herein the terms "comprising," "including," "carrying," "having," "containing," "involving," and the like are to be understood to be open-ended, that is, to mean including but not limited to. Any use of ordinal terms such as "first," "second," "third," etc., in the claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

The above described example embodiments are intended to illustrate the principles of the invention, but not to limit the scope of the invention. Various other embodiments and modifications to these preferred embodiments may be made by those skilled in the art without departing from the scope of the present invention.

The invention claimed is:

1. A backlight assembly for a mechanical reel-type gaming machine, the backlight assembly including:

a board substrate, the board substrate (i) including a rectangular light-supporting region defining four corners and (ii) being flexible along a longitudinal axis thereof to allow the board substrate to assume any one of a number of different radii about a point spaced from the longitudinal axis perpendicular to a plane of the board substrate in a relaxed state;

a number of attachment openings, the number of attachment openings including a respective attachment opening at each respective corner of the rectangular light-supporting region;

a number of rows of illumination elements mounted on the board substrate in the light-supporting region, the rows of illumination elements extending transverse to the longitudinal axis of the board substrate; and a mounting bracket having a number of mounting stand-offs, each respective mounting stand-off operable to align with a respective one of the attachment openings and form an attachment therewith so that the light-supporting region of the board substrate is bent out of the planar, relaxed state and is forced to assume a desired radius.

2. The backlight assembly of claim 1 including twenty-four evenly spaced apart rows of illumination elements.

3. The backlight assembly of claim 1 further including a connector area of the board substrate, the connector area defining an additional rectangular region which extends from the light-supporting region and includes a respective additional attachment opening positioned at each corner of the additional rectangular region, and wherein the mounting bracket includes a number of additional mounting stand-offs, each respective additional mounting stand-off operable to align with a respective additional attachment opening and form an attachment therewith so that the connector area is bent out of the planar, relaxed state and is forced out of the desired radius assumed by the light-supporting region of the board substrate.

4. The backlight assembly of claim 3 wherein the connector area comprises a portion of the board substrate projecting from the rectangular light-supporting region such that the board substrate in the connector area has a dimension perpendicular to the longitudinal axis of the board substrate that is less than the dimension of the rectangular light-supporting region of the board substrate in the direction perpendicular to the longitudinal axis of the board substrate.

5. The backlight assembly of claim 1 wherein the illumination elements in adjacent rows are staggered by the length of approximately one illumination element along the axis of the respective row.

6. A backlight assembly for backlighting a mechanical reel-type game, the backlight assembly including:

a board substrate, the board substrate being flexible along a longitudinal axis thereof;

four attachment openings, each attachment opening located at a periphery of the board substrate;

a number of rows of LEDs extending transverse to the longitudinal axis of the board substrate; and a mounting bracket having a number of mounting stand-offs, each respective mounting stand-off operable to align with a respective one of the attachment openings and form an attachment therewith so that the board substrate is bent out of a planar, relaxed state and is forced to assume a desired radius.

7. The backlight assembly of claim 6 including twenty-four evenly spaced apart rows of LEDs.

8. The backlight assembly of claim 6 further including a connector area at one longitudinal end of the board substrate, the connector area including two or more additional attachment openings, each additional attachment opening corresponding to and forming an attachment with an additional mounting stand-off.

9. The backlight assembly of claim 8 wherein the connector area comprises a portion of the board substrate projecting from the portion of the board substrate defined by the four attachment openings such that the board substrate in the connector area has a dimension perpendicular to the longitudinal axis of the board substrate that is less than the dimension of the remainder of the board substrate in the direction perpendicular to the longitudinal axis of the board substrate.

10. The backlight assembly of claim 8 wherein the connector area of the board substrate extends at an angle to the remainder of the board substrate when the board substrate is attached to the mounting bracket at the mounting stand-offs and additional mounting stand-offs so that the connector area does not maintain the radius of curvature of the remainder of the board substrate.

11. The backlight assembly of claim 6 wherein the LEDs in adjacent rows are staggered by the length of approximately one LED along the axis of the respective row.

12. The backlight assembly of claim 8 wherein the connector area defines an additional rectangular region and a respective one of the additional attachment openings is positioned at each corner of the additional rectangular region.

13. The backlight assembly of claim 8 wherein the rows of LEDs do not extend into the connector area.

14. The backlight assembly of claim 3 wherein the rows of illumination elements do not extend into the connector area.

* * * * *